(12) United States Patent
Globerman

(10) Patent No.: US 11,709,568 B2
(45) Date of Patent: Jul. 25, 2023

(54) CONVEX INTERACTIVE TOUCH DISPLAYS AND RELATED SYSTEMS AND METHODS

(71) Applicant: Promethean Limited, Blackburn (GB)

(72) Inventor: Kyle M. Globerman, Marietta, GA (US)

(73) Assignee: Promethean Limited, Blackburn (GB)

(*) Notice: Subject to any disclaimer, the term of this patent is extended or adjusted under 35 U.S.C. 154(b) by 0 days.

(21) Appl. No.: 17/185,656

(22) Filed: Feb. 25, 2021

(65) Prior Publication Data

US 2021/0263603 A1  Aug. 26, 2021

Related U.S. Application Data

(60) Provisional application No. 62/981,437, filed on Feb. 25, 2020.

(51) Int. Cl.
*G06F 3/042* (2006.01)
*H05K 5/00* (2006.01)

(52) U.S. Cl.
CPC .......... *G06F 3/042* (2013.01); *H05K 5/0017* (2013.01)

(58) Field of Classification Search
CPC ...... G06F 3/042; G06F 3/0421; G06F 3/0412; G06F 3/044; G06F 2203/04103; G06F 3/041; G06F 3/0443; G06F 3/0446; G06F 2203/04102; G06F 2203/04111; G06F 3/0445; H05K 5/0017; G02F 1/13338;

(Continued)

(56) References Cited

U.S. PATENT DOCUMENTS 4,751,379 A  6/1988  Sasaki et al.
7,889,484 B2  2/2011  Choi
(Continued)

FOREIGN PATENT DOCUMENTS

CN  110928452 A  *  3/2020
KR  1020140140261  12/2014
(Continued)

OTHER PUBLICATIONS

English Translation of foreign application CN 110928452 A (Year: 2019).*

(Continued)

*Primary Examiner* — Nelson M Rosario
(74) *Attorney, Agent, or Firm* — Brient IP Law, LLC

(57) ABSTRACT

In particular embodiments, the touch-sensing apparatus comprises: (1) a display panel; (2) a glass plate; and (3) a frame assembly. In various embodiments, the frame assembly is configured to support the display panel and the plate. The frame assembly may include any suitable bracket or combination of brackets (e.g., or other suitable assembly mechanism) configured to maintain and mount each of the plate and display panel in a suitable position. In particular embodiments, the frame assembly is configured to support the plate adjacent the display panel such that the plate is positioned in front of the display panel. In particular embodiments, the glass plate is convex such that the plate curves at least partially outwardly from the frame assembly. The apparatus may further comprise a plurality of infrared sensors and emitters disposed in a bezel of the frame assembly and configured to detect touch inputs at the convex plate.

18 Claims, 6 Drawing Sheets

(58) Field of Classification Search
CPC . G09F 9/30; G09F 9/301; H01L 27/32; H01L 27/323; H01L 27/3244; H01L 27/3279; H01L 51/003; H01L 51/0097; H01L 51/50; H01L 51/5203; H01L 2227/323; H01L 2251/5338; H01L 27/3276; H05B 33/02; H05B 33/14; H05B 33/26; Y02E 10/549

See application file for complete search history.

(56) References Cited

U.S. PATENT DOCUMENTS

| | | |
|---|---|---|
| 8,816,991 B2 | 8/2014 | Miller et al. |
| 9,024,896 B2 | 5/2015 | Chen |
| 9,207,800 B1 | 12/2015 | Eriksson et al. |
| 10,282,035 B2 | 5/2019 | Kocovski et al. |
| 10,606,416 B2 | 3/2020 | Skagmo et al. |
| 10,739,916 B2 | 8/2020 | Skagmo et al. |
| 10,775,935 B2 | 9/2020 | Kocovski et al. |
| 10,895,936 B2 | 1/2021 | Han et al. |
| 2012/0049067 A1* | 3/2012 | Takahashi ............... H01L 37/02 250/338.2 |
| 2019/0296089 A1* | 9/2019 | Isa ..................... G06F 3/0412 |

FOREIGN PATENT DOCUMENTS

| | | |
|---|---|---|
| WO | 2005/001532 | 1/2005 |
| WO | 2009/077962 | 6/2009 |
| WO | 2011/049511 | 4/2011 |
| WO | 2011/139213 | 11/2011 |
| WO | 2012/050510 | 4/2012 |
| WO | 2013/062471 | 5/2013 |
| WO | 2013159472 | 10/2013 |

OTHER PUBLICATIONS

Edmund Optics, "All About Aspheric Lenses," webpage https://www.edmundoptics.com/knowledge-center/application-notes/optics/all-about-aspheric-lenses/, Nov. 12, 2020, Edmund Optics, Inc. (Year: 2020).

* cited by examiner

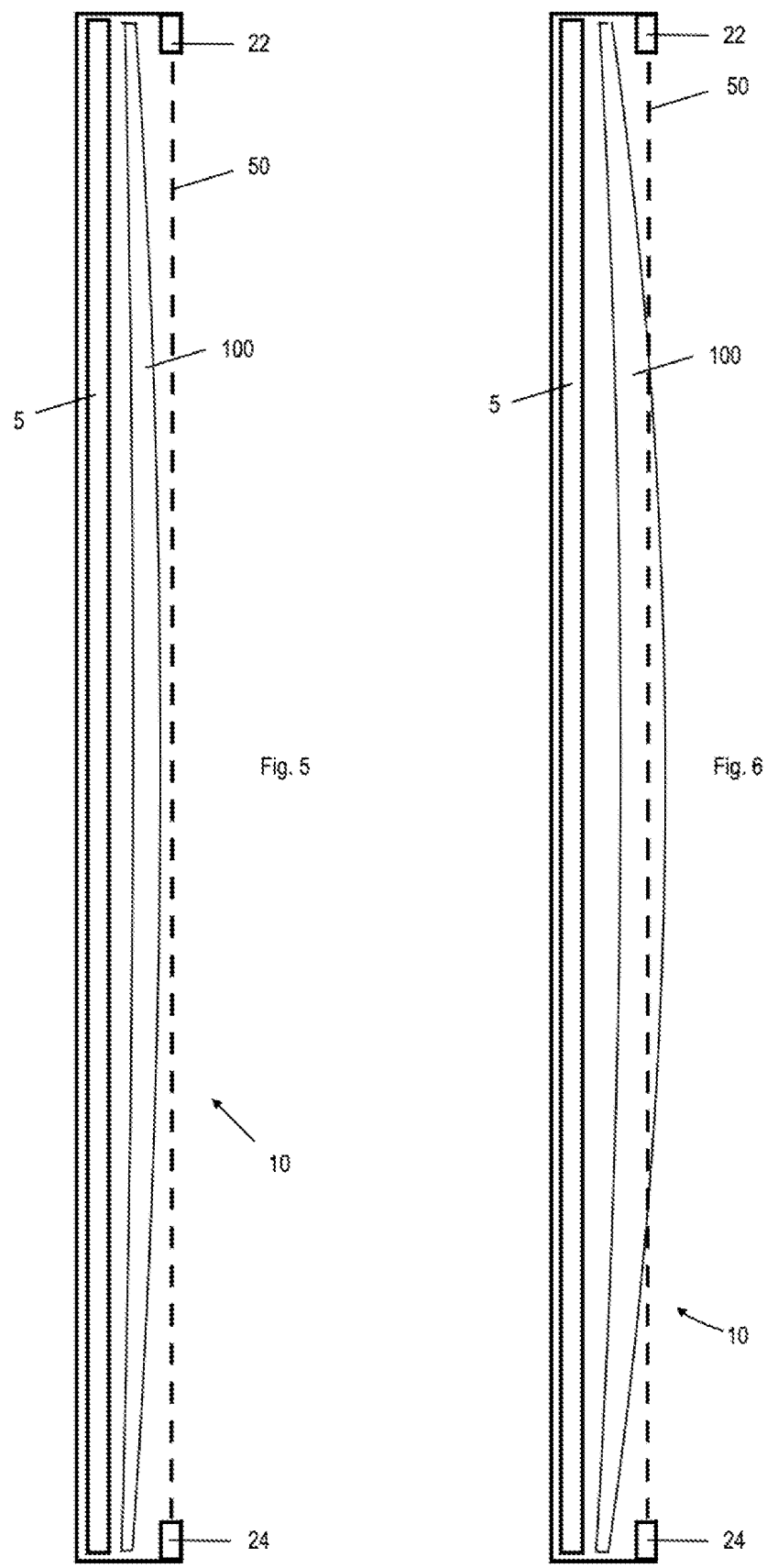

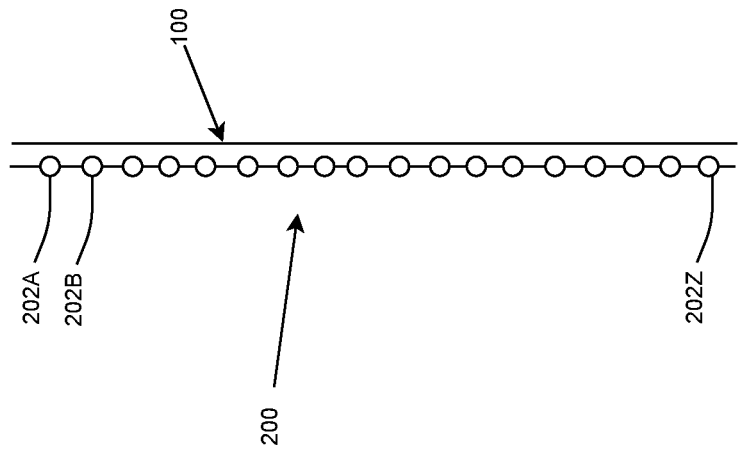
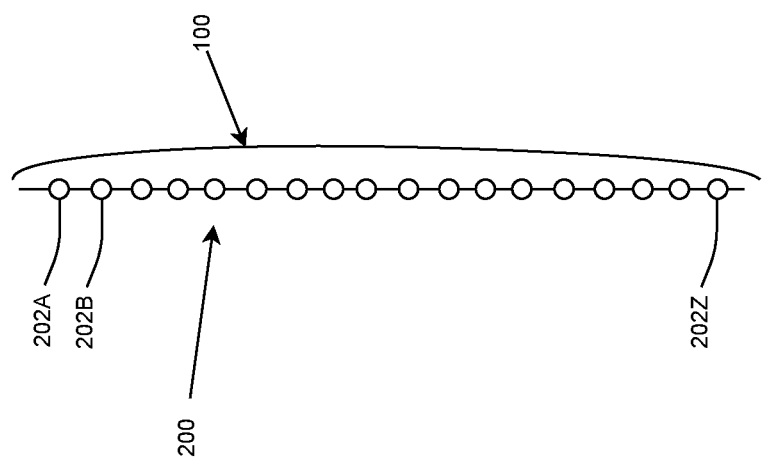
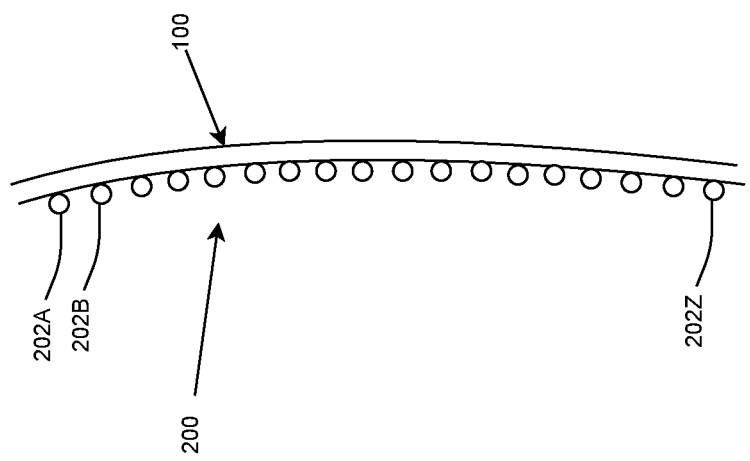

CONVEX INTERACTIVE TOUCH DISPLAYS AND RELATED SYSTEMS AND METHODS

CROSS-REFERENCE TO RELATED APPLICATIONS

This application claims priority from U.S. Provisional Patent Application Ser. No. 62/981,437, filed Feb. 25, 2020, which is hereby incorporated herein by reference in its entirety.

BACKGROUND

Variances in manufactured glass used in the production of interactive flat panel displays and other devices may affect the reliability of touch input detection on the display. Accordingly, there is a need for improved designs to address these variances and other concerns related to touch input on an interactive display device.

SUMMARY

A touch-sensing apparatus, according to particular embodiments, is substantially rectangular and defines a long edge and a short edge. In various embodiments, the apparatus comprises: (1) a display panel; (2) a plate including a touch surface; and (3) a frame assembly comprising a plurality of frame elements configured to support the display panel and the plate. In particular embodiments, the plate defines: (1) a first edge and a second edge parallel to the short edge; and (2) a third edge and a fourth edge parallel to the long edge. In some embodiments, a first plane defined by the plate is curved outward with respect to a second plane defined by the short edge and the long edge, such that the plate is substantially convex with respect to the frame assembly.

In particular embodiments, the frame assembly comprises a bezel that extends around at least a portion of an outer portion of the frame assembly. In various embodiments, the bezel is angled outward with respect to the second plane. In particular embodiments, a third plane defined by an outer face of the bezel is substantially parallel to the first plane. In some embodiments: (1) the touch-sensing apparatus defines a front surface; (2) the plurality of frame elements supports the plate in front of the display panel when the touch-sensing apparatus is viewed facing the front surface; and (3) the plate is curved outward with respect to the front surface such the plate appears convex to a user viewing the touch-sensing apparatus from the front surface.

A method of manufacturing a touch sensitive display, according to particular embodiments, comprises: (1) providing a display panel; (2) providing a plate comprising a touch surface, the plate defining a curve along a particular surface of the plate; (3) providing a frame assembly comprising a plurality of frame elements configured to support the display panel and the plate; (4) installing the display panel in the frame assembly using the plurality of frame elements; (5) orienting the plate such that the curve extends convexly toward a front portion of the touch sensitive display and the particular surface of the plate defines a front face of the plate; (6) optionally applying a coating to the particular surface of the plate; and (7) installing the plate in the frame assembly using the plurality of frame elements such that the plate is disposed in front of the display panel relative to the front portion of the touch sensitive display.

An interactive flat panel display, according to particular embodiments, comprises: (1) a display; (2) a touch plate comprising: (a) a first side edge and a second side edge that are substantially parallel to one another; (b) a first top edge and a second bottom edge that are substantially parallel to one another; (c) a first surface and a second surface that each extends between the first and second side edges and the first top edge and the second bottom edge and where the first surface is spaced apart from the second surface; and (d) a frame formed from one or more frame portions. In various embodiments: (1) the frame is configured to support the touch plate intermediate the frame and the display such that the touch plate second surface is proximate the display and the touch plate first surface is distal from the display; (2) the first surface defines a touch surface; and (3) at least a portion of the touch surface is convex and extends away from the display.

In particular embodiments, the interactive flat panel display comprises one or more of: (1) a first vertical side frame portion; (2) a second vertical side frame portion; (3) a top horizontal frame portion that is operatively coupled to the first vertical side frame portion and the second vertical side frame portion; and (4) a bottom horizontal frame portion that is operatively coupled to the first vertical side frame portion and the second vertical side frame portion.

In any embodiment described herein, a coordinate system having an X-axis, a Y-axis and a Z-axis is defined by the first vertical side frame portion and the horizontal bottom frame portion such that the Y-axis is substantially parallel to the first vertical side frame portion, the X-axis is substantially parallel to the horizontal bottom frame portion and the Z-axis is normal to the touch plate first surface. In particular embodiments, at least a portion of the plate first and second surfaces each extend away from the display along the Z-axis.

In various embodiments, at least one of the first and second side edge portions of the frame, or the top horizontal and bottom horizontal frame portions are curved such that when the touch plate is positioned intermediate the frame and the display, the touch plate flexes to match the curvature of the at least one of the first and second side edge portions of the frame or the top horizontal and bottom horizontal frame portions. In still other embodiments, each of the first and second side edge portions of the frame and the top horizontal and bottom horizontal frame portions are curved such that when the touch plate is positioned intermediate the frame and the display, the touch plate flexes to match the curvature of each of the first and second side edge portions of the frame and the top horizontal and bottom horizontal frame portions. In particular embodiments, the interactive flat panel display comprises one or more brackets that are configured to couple the display to the frame.

In particular embodiments, the interactive flat panel display comprises a plurality of infrared emitters positioned in the frame portion such that the plurality of infrared emitters generates an infrared grid in front of the first surface of the touch plate. In any embodiment described herein, at least a portion of the touch surface that extends away from the display does not intersect with the infrared grid. In still other embodiments, the at least a portion of the touch surface that extends away from the display does intersect with the infrared grid. In a particular embodiment, the infrared grid bends around the at least a portion of the touch surface.

BRIEF DESCRIPTION OF THE DRAWINGS

Various embodiments of an interactive flat panel display (e.g., touch device) are described below. In the course of this description, reference will be made to the accompanying drawings, which are not necessarily drawn to scale, and wherein:

FIG. 5 is a side cutaway view of a touch device having an outwardly curving (e.g., convex) glass plate in which the glass plate does not substantially impede a light plane/curtain (e.g., infrared plane) configured to detect one or more touch inputs on the glass plate via one or more emitters and/or detectors disposed on/in the bezel.

FIG. 6 is a side cutaway view of a touch device having an outwardly curving (e.g., convex) glass plate in which the glass plate at least partially impedes a light plane/curtain (e.g., infrared plane) configured to detect one or more touch inputs on the glass plate via one or more emitters and/or detectors disposed on/in the bezel.

FIG. 8 is a side view of a concave glass plate with a horizontally oriented infrared array.

FIG. 9 is a side view of a concave glass plate with a vertically oriented infrared array.

FIG. 10 is a side view of a substantially flat glass plate with a vertically oriented infrared array.

DETAILED DESCRIPTION

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A touch-sensing apparatus (e.g., touch device), in various embodiments, comprises an interactive touch-screen display. In particular embodiments, the touch-sensing apparatus comprises: (1) a display panel; (2) a plate (e.g., a glass plate, a plastic plate, or a plate formed from any suitable transparent material); and (3) a frame assembly. In various embodiments, the frame assembly is configured to support the display panel and the plate. In any embodiment described herein, the frame assembly may include any suitable bracket or combination of brackets (e.g., or other suitable assembly mechanism) configured to maintain and mount each of the plate and display panel in a suitable position. In particular embodiments, the frame assembly is configured to support the plate adjacent the display panel such that the plate is positioned in front of the display panel (e.g., when viewing the touch-sensing apparatus from a front face of the touch-sensing apparatus. In particular embodiments, the plate (e.g., the glass plate) is substantially convex (e.g., convex) such that the plate curves at least partially outwardly from the frame assembly. FIGS. 5 and 6 depict exemplary configurations of a touch-sensing apparatus (e.g., touch device) in which the plate is mounted in front of a display device 5 within the frame (e.g., the plate is positioned intermediate the display and the frame and is sandwiched therebetween), such that the plate curves convexly outward. In the embodiment shown in these figures, the display device 10 is configured to be viewed by a viewer from the right of the cutaway side views shown in these figures.

Figure 1:
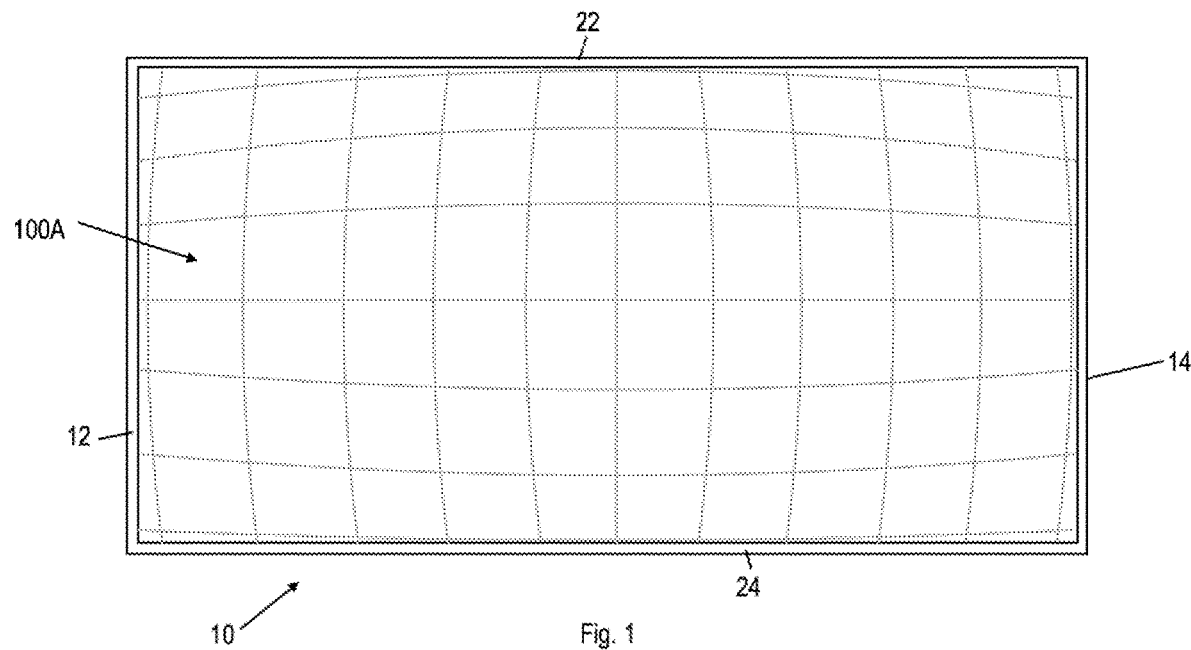
FIG. 1 is a front view of a touch device having a substantially convex glass plate such that the glass plate curves outward from the front of the touch device toward a viewer of the touch device.

In particular embodiment of a display device, such as the embodiment shown in a front view in FIG. 1, the display device 10 (e.g., interactive, touch-enabled display) includes a frame assembly that comprises: a left side member 12, a right-side member 14, an upper member 22, and a lower member 24. As may be understood from this figure, the left side member 12, right-side member 14, upper member 22, and lower member 24 define a substantially rectangular (e.g., rectangular) frame configured to support a plate 100A (e.g., glass or other suitable plate) in front of a display panel. As may be understood from this disclosure, the display device 10 is configured to display one or more images (e.g., one or more computer images) on the display panel (e.g., which a user may view through the plate 100A), while the display device 10 receives user input via the plate 100A (e.g., touch-enabled plate). In particular embodiments, the plate 100A may include any suitable touch input device (e.g., PCAP, infrared detectors and emitters, etc.).

In the embodiment shown in FIG. 1, the left side member 12, right-side member 14, upper member 22, and lower member 24 form a substantially flat frame. In this embodiment, the portion of the plate 100A most adjacent edge respective edge member 12, 14, 22, 24 may be substantially flat (e.g., at least partially flat) and substantially parallel to its respective edge member 12, 14, 22, 24. In the embodiment shown in this Figure, however, the plate 100A at least partially curves outward (e.g., bows outward) from the frame such that the plate 100A is substantially convex (e.g., convex) to a user viewing the display device 10. In the embodiment shown in this figure, the plate 100A may, for example, define a substantially spherical (e.g., spherical, e.g., somewhat spherical) surface (e.g., a portion of the plate may extend outward between 1 mm-10 mm). In some embodiments the plate (e.g., at least a portion of the plate) may extend out between 1 mm-5 mm. In other embodiments, the plate (e.g., at least a portion of the plate) may extend out between 1 mm-3 mm depending on the application. In particular embodiments, each of the left side member 12, right-side member 14, upper member 22, and lower member 24 may be integrally formed with one another. In still other embodiments, each of the left side member 12, right-side member 14, upper member 22, and lower member 24 may comprise any suitable number of individual components (e.g., which may, for example, be affixed using any suitable mechanism such as any fastener, joining technique, weldments, etc.).

Figure 7:
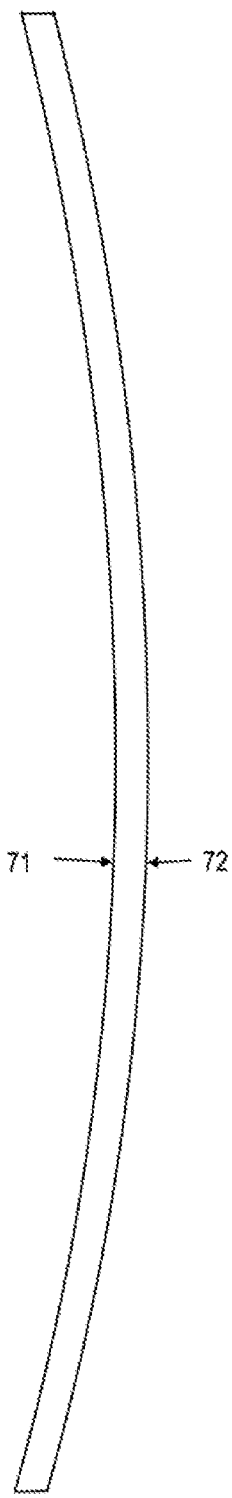
FIG. 7 is a side view of a glass plate according to various embodiments discussed herein.

As may be understood by one skilled in the art, when a glass plate (e.g., or any other plate) is manufactured (e.g., for any suitable purpose such as for use in a touch panel or other glass display, the resulting glass plate may not be planar (e.g., as a result of one or more imperfections). For example, the resultant plate may have at least some curvature as a result of a heating and cooling process used in the production of the glass plate (e.g., as a result of tempering) which may, for example, at least partially warp the resulting plate. In particular implementations and referring to FIG. 7, the resultant glass plate may have a 'concave side' 71 and a 'convex side' 72. It should be understood that the concavity and convexity of the plate shown FIG. 7 is emphasized for illustrative purposes. It should also be understood that the glass plate may cool so that the plate contains a waved surface where a portion of the glass is concave and a portion of the glass is convex. In particular embodiment, a resultant piece of glass may be at least partially concave in one or more areas, at least partially convex in one or more other areas, and have an overall curvature that is at least partially convex and/or concave. For example, a sheet of glass may have an overall shape that is convex, while having one or more localized areas of concavity. In still other embodiments, a particular sheet of glass may be substantially convex with a minor deflection (e.g., no more than a few millimeters) such that the overall sheet of glass appears (e.g., when viewed from a distance) to be substantially flat. In any case, the above-described plate may not be manufactured to have a particular shape other than flat but through the cooling and heating process the glass shape may change. Similarly, while a plate may be generally smooth (e.g., substantially smooth), the overall plate may include one or more portions that are at least partially rough (e.g., include one or more areas of varying roughness).

In a particular embodiment, a method of manufacturing a touch-display device having a convex panel (e.g., glass panel) may include one or more steps such as, for example: (1) providing a frame; (2) selecting a plate (e.g., a glass plate); (3) providing a display panel 5; (4) identifying a convex side of the plate (e.g., and optionally coating the convex side with any suitable coating); (5) orienting the plate such that the convex side is positioned facing outward from the frame; and (6) installing the display panel in the frame such that the plate is intermediate the frame and the display panel. In various embodiments, assembling the touch device may further involve bracketing the display panel into the frame such that the glass panel is between the frame and the display panel. In such embodiments, this bracketing may cause a curvature of the glass or other panel in any embodiment described herein (e.g., as a result of the shape of the frame/bezel such as from curvature and/or angling of any suitable member described herein). As such, embodiments such as those shown in FIG. 1 may result from the substantially flat frame described and a panel that is 'naturally' convex as a result of the manufacturing process used to produce it.

Various embodiment of the display device 10 shown in FIG. 1 may further include a touch input device embodied within a bezel of the display device 10. In various embodiments, the frame assembly may include a plurality of radiation (e.g., light, ultra-violet light, infrared light, or other suitable radiation) emitters and detectors around a perimeter of the frame (e.g., about an entire perimeter of the frame along the left side member 12, right-side member 14, upper member 22, and lower member 24). The bezel may, for example, broadcast a suitable grid and/or light curtain 50 (e.g., as shown in FIGS. 5 and 6 across a surface of the plate 100A). In particular embodiments, the bezel may be configured to detect input at the surface of the plate 100A in response to detecting one or more breaks in the grid/light curtain 50 (e.g., radiation field). As shown in FIGS. 5 and 6, the plate 100 may or may not impede the grid/light curtain 50 (e.g., at least partially intersect or extend through the grid/light curtain). The interaction of the plate 100 and the grid/light curtain 50 may, for example, depend on a natural curvature of the plate 100, an imposed curvature of the plate 100, a position of the grid/light curtain 50 based on the configuration of the bezel, etc. In particular embodiments, such as shown in FIG. 6, the at least partial intersection and/or extension of the plate 100 through the grid/light curtain 50 may have substantially no (e.g., no) impact on the functionality of the light curtain as an input device (e.g., the display device may still be configured to successfully detect any input on the surface of the plate 100). In still other embodiments, the at least partial intersection and/or extension of the plate 100 through the grid/light curtain 50 may limit an accuracy of one or more detected touch inputs by the one or more radiation emitters.

Figure 2:
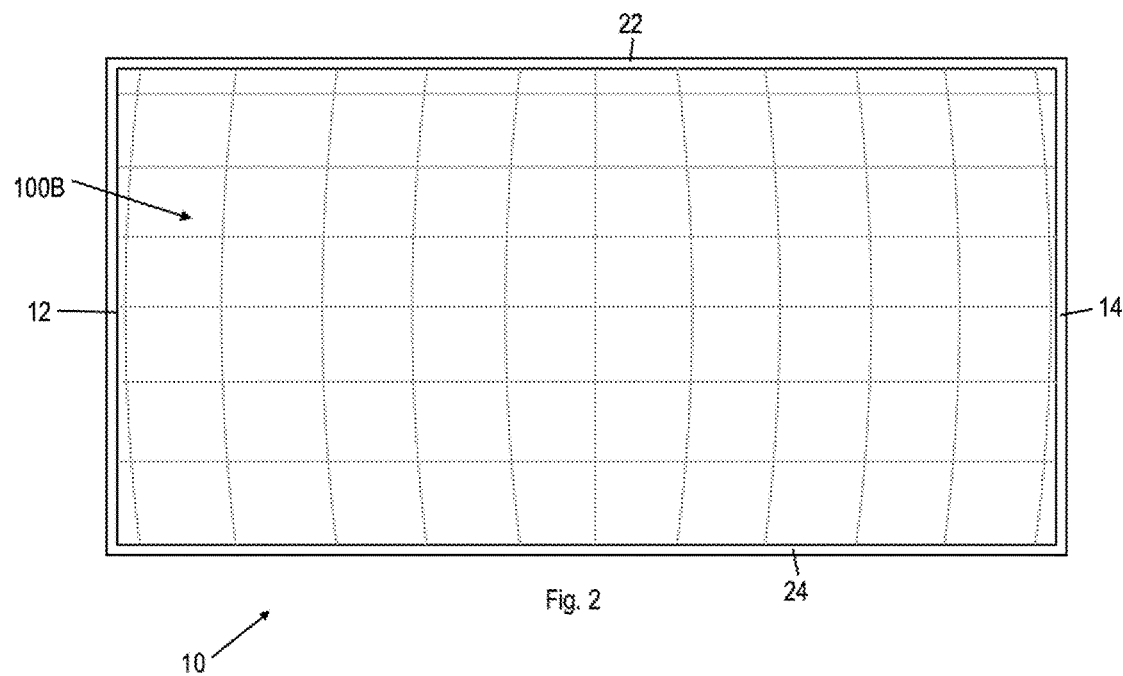
FIG. 2 is a front view of a touch device having a substantially convex glass plate according to another embodiment.

FIG. 2 depicts a display device 10 according to yet another embodiment. In the embodiment shown in this figure, upper member 22 and lower member 24 may, for example, arch at least partially outward from the rest of the frame such that the upper member 22 and lower member 24 each form a respective positive angle with a plane defined by the left side member 12, right-side member 14, upper member 22, and lower member 24. In various other embodiments (e.g., any embodiment described herein), a particular frame member may be defined along a radius of any length (e.g., as a result of the particular frame member at least partially curving/bending away from the plane defined by the left side member 12, right-side member 14, upper member 22, and lower member 24). As may be understood from this figure, the left side member 12 and right-side member 14 remain substantially flat relative to the plane defined by the left side member 12, right-side member 14, upper member 22, and lower member 24. As shown in this figure, the plate 100B is substantially convex, having a substantially cylindrical (e.g., cylindrical) curve in the X direction. In the embodiment shown in this figure, the plate 100B may have been at least partially flat (e.g., flat) prior to installation in the frame. The upper and lower members 22, 24 may cause the plate 100B to partially curve while installed in the frame as a result of pressure from the upper and lower members 22, 24 as a result of these members being curved and/or angled relative to the flat plane.

As may be understood from FIG. 2 and FIGS. 5 and 6, it should be understood that, in various embodiments, a curvature of the plate 100B may result in potential impedance of the grid/light curtain 50 (e.g., in embodiments with a touch-input device embodied in the bezel as described above) across the plate 100B from left to right (e.g., as opposed to up and down). It should be understood that, in embodiments in which the plate 100 does at least partially extend into the light curtain 50 (e.g., infrared grid), the at least partial intersection and/or extension of the plate 100 through the grid/light curtain 50 may have substantially no (e.g., no) impact on (e.g., may not interfere with) the functionality of the bezel as an input device (e.g., the display device may still be configured to successfully detect any input on the surface of the plate 100). In still other embodiments, the at least partial intersection and/or extension of the plate 100 through the grid/light curtain 50 may impact the functionality of the bezel (i.e., infrared grid) as an input device (e.g., because at least a portion of each of the infrared beams that make up the grid may be blocked by the plate 100, thereby preventing input detection in those locations). In particular embodiments, positioning the light curtain 50 (e.g., array of infrared emitters and receivers within the bezel such that the bezel is higher than the plate 100 in order to prevent obstruction of the grid 50 by the plate 100. In such embodiments, because of the convex surface of the plate 100, particular portions of the plate (e.g., portions around a perimeter of the plate) may be positioned further form the grid 50 than more central portions). As such, input detection at different locations along the surface of the plate 100 may have varying accuracy based on variances in distances from the surface of the plate 100 to the planar grid 50. For example, in central portions of the panel, input detection accuracy may be relatively good. However, closer to the edges of the panel, the input detection may be inaccurate because of the input detection height resulting from the distance between the infrared grid and the surface of the plate.

Figure 3:
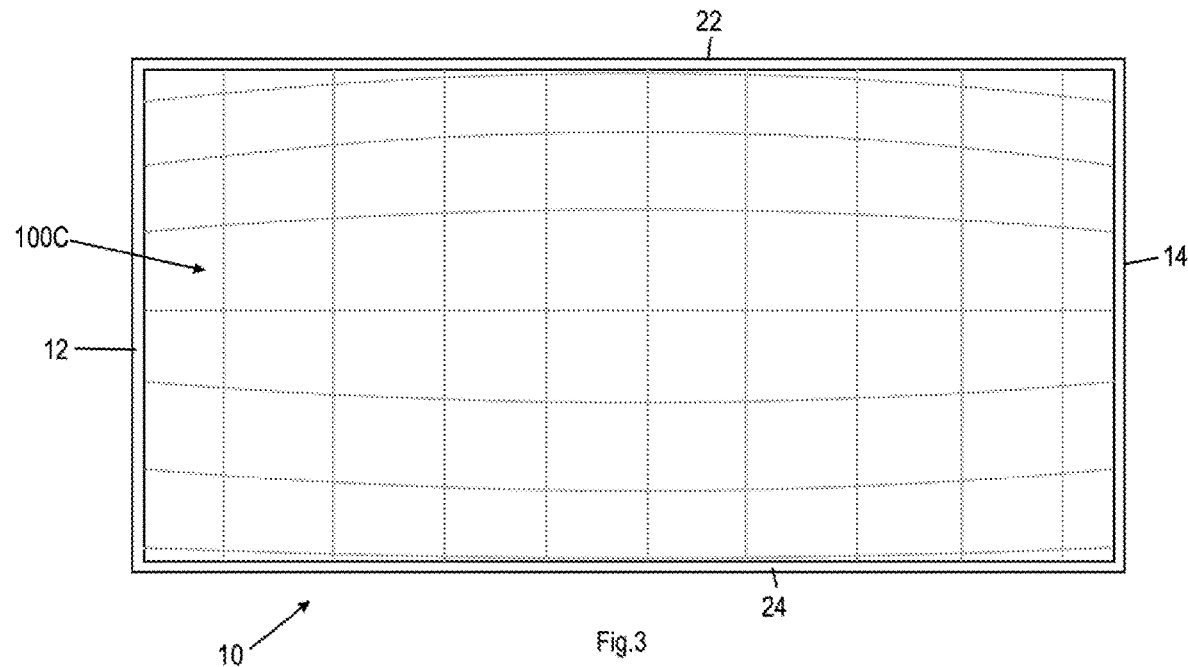
FIG. 3 is a front view of a touch device having a substantially convex glass plate according to yet another embodiment.

FIG. 3 depicts a display device 10 according to yet another embodiment. In the embodiment shown in this figure, left side member 12 and right-side member 14 may, for example, arch at least partially outward from the rest of the frame such that the left side member 12 and right-side member 14 each form a respective positive angle with a plane defined by the left side member 12, right-side member 14, upper member 22, and lower member 24. As may be understood from this figure, the upper member 22 and lower member 24 remain substantially flat relative to the plane defined by the left side member 12, right-side member 14, upper member 22, and lower member 24. As shown in this figure, the plate 100C is substantially convex, having a substantially cylindrical (e.g., cylindrical) curve in the Y direction. In the embodiment shown in this figure, the plate 100C may have been at least partially flat (e.g., flat) prior to installation in the frame. The left-side and right-side members 12,14 may cause the plate 100C to partially curve while installed in the frame as a result of pressure from the left-side and right-side members as a result of their angle relative to the flat plane.

As may be understood from FIG. 3 and FIGS. 5 and 6, it should be understood that, in various embodiments, a curvature of the plate 100C may result in potential impedance of the grid/light curtain 50 (e.g., in embodiments with a touch-input device embodied in the bezel as described above) across the plate 100C from top to bottom (e.g., as opposed to left and right). In should be understood that, in embodiments in which the plate 100 does at least partially extend into the light curtain 50 (e.g., infrared grid), the at least partial intersection and/or extension of the plate 100 through the grid/light curtain 50 may have substantially no (e.g., no) impact on (e.g., may not interfere with) the functionality of the bezel as an input device (e.g., the display device may still be configured to successfully detect any input on the surface of the plate 100).

In particular embodiments, the bezel may be at least partially integrally formed with the left side member 12, right-side member 14, upper member 22, and lower member 24 (e.g., may at least partially comprise the left side member 12, right-side member 14, upper member 22, and/or lower member 24). In such embodiments, and embodiments in which one or more members arch at least partially outward from the frame in order to impose at least a partial curvature on the plate 100, one or more emitters (e.g., a plurality of infrared emitters) positioned disposed on the particular member may also angle at least partially away from a flat plane of the display device. In such embodiments, the grid may at least partially curve around a surface of the panel 100. In still other embodiments, the grid may extend at least partially through the panel (e.g., glass panel).

In particular embodiments, the grid may define a touch surface that is at least partially spaced apart from an outer surface of the panel 100. In particular embodiments, the grid may be configured to detect input at least a particular distance from the panel (e.g., up to 1 mm, up to 2 mm, up to 1.5 mm, up to 3 mm, up to 4 mm, or any other suitable distance).

In various embodiments, the touch-sensing apparatus may be configured to mitigate inaccurate location detection as a result of higher contact points (e.g., in some locations) due to the use of convex plates by utilizing flatter plates (e.g., plates that are overall flatter, while still having at least some convexity, whether through manufacturing or bracket pressure). In embodiments in which the touch-sensing apparatus comprises a somewhat flatter plate (e.g., piece of glass), the touch-sensing apparatus may comprise an infrared bezel that is sufficiently close to the entire surface of the plate to ensure at least somewhat accurate (e.g., accurate) input location detection. In particular embodiments, a flatter plate may be somewhat thinner than a less flat plate (e.g., between about 2 millimeters and about 2.8 millimeters). In particular embodiments, the plate has a convexity of less than 1.5 millimeters (e.g., in order to enable accurate input detection via the infrared grid disposed in front of the plate). In various embodiments, a thinner plate (e.g., thinner glass plate) may be at least partially flexible (e.g., which may enable the plate to be bent to the desired convexity). However, a plate that has at least a particular level of flexibility may be susceptible to bending from applied forces (e.g., from a user touching the plate to provide input to the touch-sensing apparatus. In various embodiments, the touch-sensing apparatus may include a plate that is affixed to (e.g., mounted adjacent) a display panel 5 (e.g., LCD open cell or other suitable display panel) via a suitable zero bonding and/or full optical bonding technique. In such embodiments, the touch-sensing apparatus may eliminate an air gap between the plate 100 and the display device 5 (e.g., by bonding the plate 100 directly (e.g., substantially directly) to the display device 5). The removal of an air gap, in particular embodiments, may reduce a flexion of the plate from force applied by users when providing touch inputs. In particular embodiments, a more rigid plate may increase an accuracy of touch inputs by reducing a variance of the distance from the plate 100 to the grid 50 (e.g., infrared grid).

Figure 4:
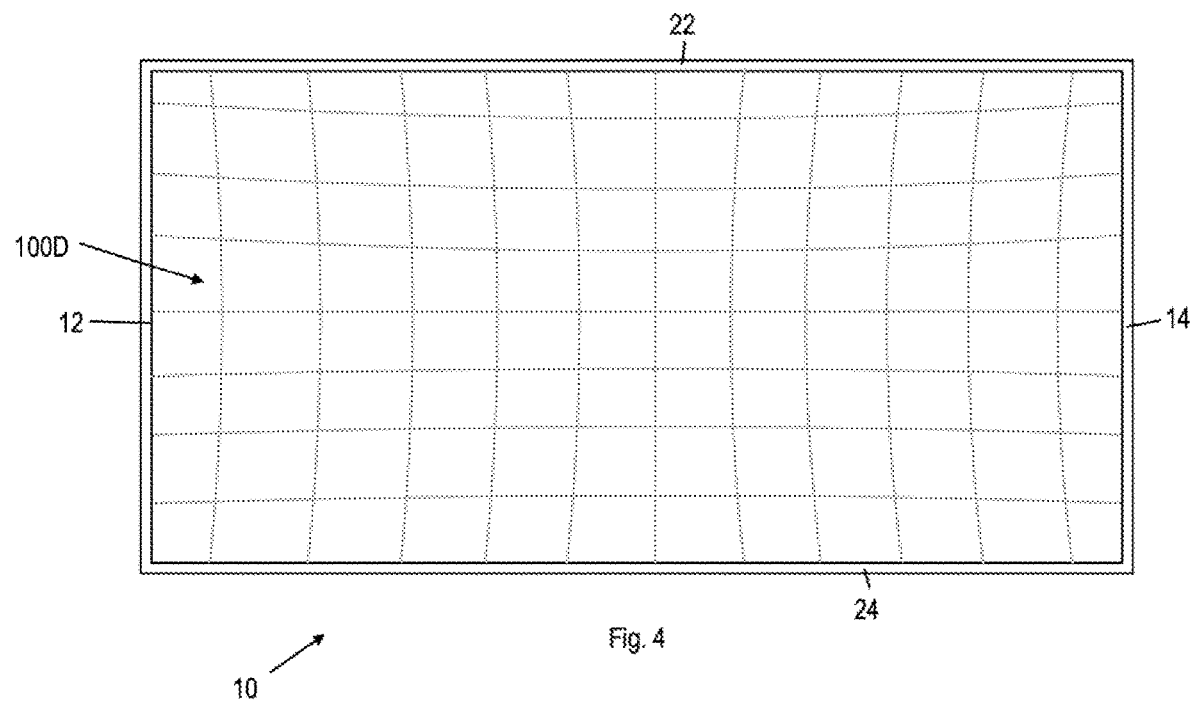
FIG. 4 is a front view of a touch device having a substantially concave glass plate such that the glass plate curves inward from the front of the touch device away from a viewer of the touch device.

FIG. 4 depicts a display device 10 according to yet another embodiment. In the embodiment shown in this figure, the left side member 12, right-side member 14, upper member 22, and lower member 24 may, for example, arch (e.g., angle) at least partially inward from the rest of the frame such that the left side member 12, right-side member 14, upper member 22, and lower member 24 each form a respective negative angle with a plane defined by the left side member 12, right-side member 14, upper member 22, and lower member 24. As may be understood from this figure, the plate 100D is substantially concave, having a substantially spherical (e.g., spherical) concave surface. In the embodiment shown in this figure, the plate 100D may have been at least partially flat (e.g., flat) prior to installation in the frame. The left side member 12, right-side member 14, upper member 22, and lower member 24 may cause the plate 100C to partially curve (e.g., as a result of pressure from each member and/or the shape of the frame) while installed in the frame intermediate the frame and the display).

In still other embodiments, the left side member 12, right-side member 14, upper member 22, and lower member 24 may, for example, each arch (e.g., angle) at least partially outward from the rest of the frame such that the left side member 12, right-side member 14, upper member 22, and lower member 24 each form a respective positive angle with a plane defined by the left side member 12, right-side member 14, upper member 22, and lower member 24. As may be understood from this disclosure, the plate 100 would be substantially convex (e.g., as shown in FIG. 1), having a substantially spherical (e.g., spherical) convex surface. In such an embodiment, the plate 100 may have been at least partially flat (e.g., flat) prior to installation in the frame. The left side member 12, right-side member 14, upper member 22, and lower member 24 may cause the plate 100D to partially curve (e.g., as a result of pressure from each member and/or the shape of the frame) while installed in the frame).

In particular embodiments, when glass is manufactured, it experiences a cycle of heating and cooling (e.g., tempering). During this process, the glass (e.g., plate) may at least partially warp. Even though a particular panel (e.g., piece of glass) may be at least partially warped, when the plate is mounted into a frame (e.g., bezel), the display is mounted behind it, and the plate and panel are bracketed to the frame/bezel, the plate may at least partially bend/curve to take on a shape of the frame (e.g., bezel). This may, for example, result in a concave and/or convex plate regardless of an initial shape or curvature of the plate prior to installation in the frame/bezel (e.g., such as any shape and/or configuration or curvature of plate described herein.

In various embodiments, such as any embodiment described herein, the frame may comprise the bezel. In other embodiments, the frame may incorporate at least a portion of the bezel. In still other embodiments, the frame may be at least partially independent of the bezel. In other embodiments, the frame may not comprise the bezel.

In various embodiments, curvature of the plate may, for example, be measured with respect to the display device hanging on a vertical wall (e.g., with the front of the plate facing outwards). In order to determine whether the glass is convex, a user may, for example, measure a distance from a front face of the plate to a planar surface at a particular interval (e.g., every 2 inches). The measurement may occur, for example, along a line that goes through the center of the plate. In still other embodiments, a curvature (e.g., convexity) of the plate may be determined using any other suitable technique.

Additional Embodiments

In particular other embodiments, an interactive flat panel display may comprise: (1) a display; (2) a touch plate comprising (a) a first side edge and a second side edge that are substantially parallel to one another; (b) a first top edge and a second bottom edge that are substantially parallel to one another; (c) a first surface and a second surface that each extends between the first and second side edges and the first top edge and the second bottom edge and where the first surface is spaced apart from the second surface; (d) a frame formed from one or more frame portions. In various embodiments, the frame is configured to support the touch plate intermediate the frame and the display such that: (1) the touch plate second surface is proximate the display and the touch plate first surface is distal from the display; (2) the first surface defines a touch surface; and (3) at least a portion of the touch surface is convex and extends away from the display. In various embodiments, the one or more frame portions are configured to apply a force to the first side edge and the second side edge resulting in the at least the portion of the touch surface being convex.

In any embodiment of an interactive flat panel display describe herein, the frame may further comprise: (1) a first vertical side frame portion; (2) a second vertical side frame portion; (3) a top horizontal frame portion that is operatively coupled to the first vertical side frame portion and the second vertical side frame portion; and (4) a bottom horizontal frame portion that is operatively coupled to the first vertical side frame portion and the second vertical side frame portion. In such embodiments, the first vertical side frame portion and second vertical side frame portion may be configured to apply configured to apply respective force to the first side edge and the second side edge resulting in the at least the portion of the touch surface being convex (e.g., causing at least a partial curve in the surface.

In various embodiments of an interactive flat panel display, a coordinate system having an X-axis, a Y-axis and a Z-axis may be defined by the first vertical side frame portion and the horizontal bottom frame portion such that the Y-axis is substantially parallel to the first vertical side frame portion, the X-axis is substantially parallel to the horizontal bottom frame portion and the Z-axis is normal to the touch plate first surface. In still other embodiments, at least a portion of the plate first and second surfaces each extend away from the display along the Z-axis.

In any embodiment of an interactive flat panel display describe herein, at least one of the first and second side edge portions of the frame, or the top horizontal and bottom horizontal frame portions may be curved such that when the touch plate is positioned intermediate the frame and the display, the touch plate flexes to match the curvature of the at least one of the first and second side edge portions of the frame or the top horizontal and bottom horizontal frame portions In still other embodiments, each of the first and second side edge portions of the frame and the top horizontal and bottom horizontal frame portions are curved such that when the touch plate is positioned intermediate the frame and the display, the touch plate flexes to match the curvature of each of the first and second side edge portions of the frame and the top horizontal and bottom horizontal frame portions.

In various other embodiments: (1) the interactive flat panel display further comprises one or more brackets that are configured to couple the display to the frame; (2) the interactive flat panel display further comprises a plurality of infrared emitters positioned in the frame portion such that the plurality of infrared emitters generates an infrared grid in front of the first surface of the touch plate; (3) at least a portion of the touch surface that extends away from the display does not intersect with the infrared grid; (4) the at least a portion of the touch surface that extends away from the display does intersect with the infrared grid; and/or (5) the infrared grid bends around the at least a portion of the touch surface.

FIGS. 8-10 depict various embodiments of a concave plate 100 with an infrared printed circuit board assembly 200 positioned adjacent. As may be understood from this figure, the infrared printed circuit board assembly 200 comprises a plurality of infrared emitters and detectors (202A, 202B, . . . , 202Z) disposed along each edge of the plate. In particular embodiments, a horizontally oriented infrared printed circuit board assembly 200 (e.g., as shown in FIG. 8) may be sufficiently flexible to be installed parallel to the plate 100 such that the infrared printed circuit board assembly 200 follows the convex curve of the plate 100. In other embodiments, the infrared printed circuit board assembly 200. In other embodiments, a vertically oriented infrared printed circuit board assembly 200 (e.g., as shown in FIG. 9) may be substantially rigid such that the infrared printed circuit board assembly 200 is substantially straight. In such embodiments, the infrared printed circuit board assembly 200 may be spaced apart from a surface of the plate 100 and positioned such that the infrared printed circuit board assembly 200 may generate a touch-sensitive grid of infrared light that is able to detect a touch input at any suitable location of the plate 100.

Figure 12:
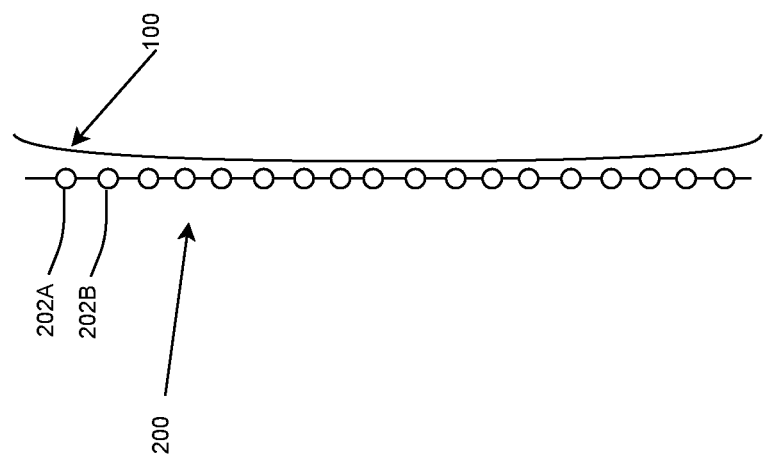
FIG. 12 is a side view of a convex glass plate with a vertically oriented infrared array.
Figure 11:
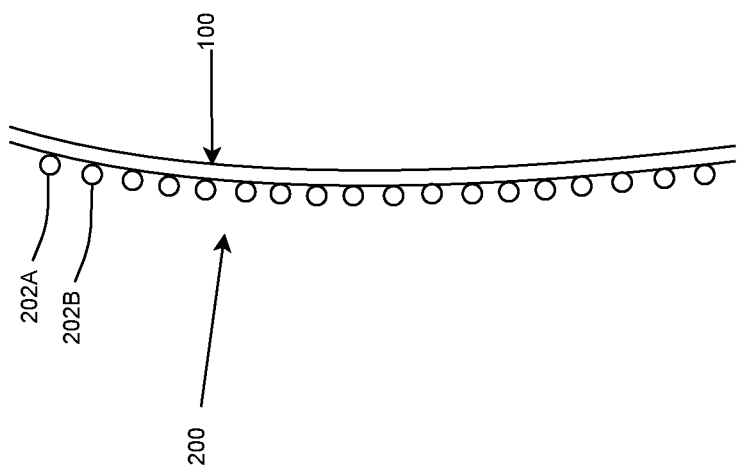
FIG. 11 is a side view of a convex glass plate with a horizontally oriented infrared array.

FIG. 10 depicts a vertically oriented infrared printed circuit board assembly 200 disposed adjacent a substantially flat (e.g., flat) plate 100. FIGS. 11 and 12 depict a horizontally and vertically oriented infrared printed circuit board assembly 200 respectively.

In a particular embodiment, a frame assembly comprises a plurality of frame elements configured to support the display panel and the plate. In such embodiments, the plate defines: (1) a first edge and a second edge parallel to the short edge; and (2) a third edge and a fourth edge parallel to the long edge. In this example, a first plane defined by the plate is curved outward with respect to a second plane defined by the short edge and the long edge, such that the plate is substantially convex with respect to the frame assembly.

In various embodiments, the bezel comprises a plurality of infrared emitters and infrared detectors disposed about a perimeter of the frame such that the plurality of infrared emitters defines a planar infrared grid that is spaced apart from the substantially convex plate. In various embodiments, the plurality of infrared emitters and infrared detectors are embodied as a printed circuit board assembly that is disposed substantially perpendicular to the second plane.

In other embodiments, the plurality of infrared emitters and infrared detectors are embodied as a printed circuit board assembly that is disposed substantially parallel to the first plane.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A touch-sensing apparatus having a long edge and a short edge, the apparatus comprising:
   a display panel;
   a plate including a touch surface; and
   a frame assembly comprising a plurality of frame elements configured to receive the display panel and the plate, wherein:
      the plate defines:
         a first edge and a second edge parallel to the short edge; and
         a third edge and a fourth edge parallel to the long edge; and
      a first plane defined by the plate is curved outward with respect to a second plane defined by the short edge and the long edge, such that the plate is substantially convex with respect to the frame assembly, wherein:
         the frame assembly comprises a rigid bezel that extends around at least a portion of an outer portion of the plate; and
         the rigid bezel comprises a plurality of infrared emitters and infrared detectors disposed about a perimeter of the frame such that the plurality of infrared emitters defines a planar infrared grid that is spaced apart from the substantially convex plate.

2. The touch-sensing apparatus of claim 1, wherein:
   the rigid bezel is angled outward with respect to the second plane.

3. The touch-sensing apparatus of claim 1, wherein the plurality of infrared emitters and infrared detectors are embodied as a printed circuit board assembly that is disposed substantially perpendicular to the second plane.

4. The touch-sensing apparatus of claim 1, wherein the plurality of infrared emitters and infrared detectors are embodied as a printed circuit board assembly that is disposed substantially parallel to the first plane.

5. The touch-sensing apparatus of claim 1, wherein a third plane defined by an outer face of the rigid bezel is substantially parallel to the first plane.

6. The touch-sensing apparatus of claim 1, wherein:
   the touch-sensing apparatus defines a front surface;
   the plurality of frame elements receives the plate in front of the display panel when the touch-sensing apparatus is viewed facing the front surface; and
   the plate is curved outward with respect to the front surface such that the plate appears convex to a user viewing the touch-sensing apparatus from the front surface.

7. The touch-sensing apparatus of claim 1, wherein the plurality of frame elements is configured to bend the plate to cause the plate to be substantially convex with respect to the frame assembly.

8. A method of manufacturing a touch sensitive display, the method comprising:
   providing a display panel;
   providing a plate comprising a touch surface, the plate defining a curve along a particular surface of the plate;
   providing a frame assembly comprising a plurality of frame elements configured to support the display panel and the plate;
   installing the display panel in the frame assembly using the plurality of frame elements;
   orienting the plate such that the curve extends convexly toward a front portion of the touch sensitive display and the particular surface of the plate defines a front face of the plate;
   applying a coating to the particular surface of the plate; and
   installing the plate in the frame assembly using the plurality of frame elements such that the plate is disposed in front of the display panel relative to the front portion of the touch sensitive display, and the plurality of frame elements cause the plate to bend convexly outward with respect to the frame assembly.

9. An interactive flat panel display comprising:
   a display;
   a substantially rigid touch plate comprising:
      a first side edge and a second side edge that are substantially parallel to one another;
      a first top edge and a second bottom edge that are substantially parallel to one another;
      a first surface and a second surface that each extends between the first and second side edges and the first top edge and the second bottom edge and where the first surface is spaced apart from the second surface; and a frame formed from one or more frame portions, wherein;
    the frame is configured to support the touch plate intermediate the frame and the display such that the touch plate second surface is proximate the display and the touch plate first surface is distal from the display;
    the first surface defines a touch surface; and
    at least a portion of the touch surface is convex and extends away from the display, wherein the interactive flat panel display further comprises a plurality of infrared emitters positioned in the frame portion such that the plurality of infrared emitters generates an infrared grid in front of the first surface of the touch plate.

10. The interactive flat panel display of claim 9, wherein the frame further comprises:
    a first vertical side frame portion;
    a second vertical side frame portion;
    a top horizontal frame portion that is operatively coupled to the first vertical side frame portion and the second vertical side frame portion; and
    a bottom horizontal frame portion that is operatively coupled to the first vertical side frame portion and the second vertical side frame portion.

11. The interactive flat panel display of claim 10, wherein a coordinate system having an X-axis, a Y-axis and a Z-axis is defined by the first vertical side frame portion and the horizontal bottom frame portion such that the Y-axis is substantially parallel to the first vertical side frame portion, the X-axis is substantially parallel to the horizontal bottom frame portion and the Z-axis is normal to the touch plate first surface.

12. The interactive flat panel display of claim 10, wherein at least a portion of the plate first and second surfaces each extend away from the display along the Z-axis.

13. The interactive flat panel display of claim 10, wherein at least one of the first and second side edge portions of the frame, or the top horizontal and bottom horizontal frame portions are curved such that when the touch plate is positioned intermediate the frame and the display, the touch plate flexes to match the curvature of the at least one of the first and second side edge portions of the frame or the top horizontal and bottom horizontal frame portions.

14. The interactive flat panel display of claim 13, wherein each of the first and second side edge portions of the frame and the top horizontal and bottom horizontal frame portions are curved such that when the touch plate is positioned intermediate the frame and the display, the touch plate flexes to match the curvature of each of the first and second side edge portions of the frame and the top horizontal and bottom horizontal frame portions.

15. The interactive flat panel display of claim 9, further comprising one or more brackets that are configured to couple the display to the frame.

16. The interactive flat panel display of claim 9, wherein the at least a portion of the touch surface that extends away from the display does not intersect with the infrared grid.

17. The interactive flat panel display of claim 9, wherein the at least a portion of the touch surface that extends away from the display does intersect with the infrared grid.

18. The interactive flat panel display of claim 17, wherein the infrared grid bends around the at least a portion of the touch surface.

* * * * *